(12) United States Patent
Gusikhin et al.

(10) Patent No.: US 9,878,709 B2
(45) Date of Patent: Jan. 30, 2018

(54) SYSTEM AND METHOD FOR AUTOMATIC ACTIVATION OF AUTONOMOUS PARKING (71) Applicant: Ford Global Technologies, LLC, Dearborn, MI (US)

(72) Inventors: Oleg Yurievitch Gusikhin, West Bloomfield, MI (US); Omar Makke, Lyon Township, MI (US); Kevin Lee Helpingstine, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/583,524

(22) Filed: May 1, 2017

(65) Prior Publication Data

US 2017/0232961 A1   Aug. 17, 2017

Related U.S. Application Data (63) Continuation of application No. 14/993,922, filed on Jan. 12, 2016, now Pat. No. 9,637,117.

(51) Int. Cl.
| | |
|---|---|
| *B60W 30/06* | (2006.01) |
| *G01C 21/36* | (2006.01) |
| *G08G 1/14* | (2006.01) |
| *G05D 1/02* | (2006.01) |
| *B60W 40/08* | (2012.01) |

(52) U.S. Cl.
CPC ............ *B60W 30/06* (2013.01); *B60W 40/08* (2013.01); *G01C 21/3694* (2013.01); *G05D 1/024* (2013.01); *G05D 1/0246* (2013.01); *G05D 1/0255* (2013.01); *G05D 1/0257* (2013.01); *G08G 1/14* (2013.01); *B60W 2040/0809* (2013.01)

(58) Field of Classification Search
None
See application file for complete search history.

(56) References Cited

U.S. PATENT DOCUMENTS

| | | | | |
|---|---|---|---|---|
| 8,542,130 | B2 * | 9/2013 | Lavoie | B62D 15/0285 |
| | | | | 180/199 |
| 9,283,960 | B1 * | 3/2016 | Lavoie | B60W 30/06 |
| 9,286,803 | B2 * | 3/2016 | Tippelhofer | G08G 1/143 |

(Continued)

FOREIGN PATENT DOCUMENTS

| | | |
|---|---|---|
| DE | 102006058213 A1 | 7/2008 |
| JP | 2014125196 A | 7/2014 |

(Continued)

OTHER PUBLICATIONS

Search Report dated Jul. 11, 2017 for GB Patent Application No. Enter 15/583,524, pp. 3.

*Primary Examiner* — Jonathan M Dager
(74) *Attorney, Agent, or Firm* — James P. Muraff; Neal, Gerber & Eisenberg LLP (57) ABSTRACT

A system for parking a vehicle is disclosed. In various embodiments, the system includes a vehicle including a motor, sensors, a steering system, a processor, and a memory; an autopark program operatively connected to the vehicle's steering system; a navigation program operatively connected to the vehicle and configured to determine the vehicle's speed and lane with the sensors, to evaluate the data, and in response to the evaluation, to automatically execute the autopark program.

20 Claims, 11 Drawing Sheets

(56) References Cited

U.S. PATENT DOCUMENTS

| | | | |
|---|---|---|---|
| 9,522,675 B1* | 12/2016 | You | B60W 30/06 |
| 9,637,117 B1 | 5/2017 | Gusikhin et al. | |
| 2006/0235590 A1* | 10/2006 | Bolourchi | B62D 7/159 |
| | | | 701/41 |
| 2008/0154464 A1* | 6/2008 | Sasajima | B62D 15/0285 |
| | | | 701/42 |
| 2009/0289813 A1* | 11/2009 | Kwiecinski | B60Q 9/006 |
| | | | 340/932.2 |
| 2009/0313095 A1* | 12/2009 | Hurpin | E04H 6/14 |
| | | | 705/13 |
| 2010/0152972 A1* | 6/2010 | Attard | B62D 15/027 |
| | | | 701/42 |
| 2011/0082613 A1* | 4/2011 | Oetiker | B60W 10/20 |
| | | | 701/25 |
| 2012/0072067 A1* | 3/2012 | Jecker | B62D 15/0285 |
| | | | 701/25 |
| 2012/0083960 A1* | 4/2012 | Zhu | G05D 1/0055 |
| | | | 701/23 |
| 2012/0173080 A1* | 7/2012 | Cluff | B62D 15/0285 |
| | | | 701/42 |
| 2013/0021171 A1* | 1/2013 | Hsu | G06K 9/00812 |
| | | | 340/932.2 |
| 2013/0024202 A1* | 1/2013 | Harris | G06Q 30/00 |
| | | | 705/1.1 |
| 2013/0073119 A1* | 3/2013 | Huger | B62D 15/027 |
| | | | 701/1 |
| 2013/0110342 A1* | 5/2013 | Wuttke | B62D 15/027 |
| | | | 701/23 |
| 2013/0289825 A1* | 10/2013 | Noh | B62D 15/0285 |
| | | | 701/42 |
| 2014/0121930 A1* | 5/2014 | Allexi | B60W 50/10 |
| | | | 701/70 |
| 2014/0188339 A1* | 7/2014 | Moon | B62D 15/0285 |
| | | | 701/41 |
| 2014/0240502 A1* | 8/2014 | Strauss | B60W 30/06 |
| | | | 348/148 |
| 2014/0303839 A1 | 10/2014 | Filev et al. | |
| 2014/0320318 A1* | 10/2014 | Victor | G08G 1/142 |
| | | | 340/932.2 |
| 2014/0350855 A1* | 11/2014 | Vishnuvajhala | G06Q 50/10 |
| | | | 701/538 |
| 2015/0039173 A1* | 2/2015 | Beaurepaire | B60W 30/06 |
| | | | 701/23 |
| 2015/0066545 A1* | 3/2015 | Kotecha | G06Q 10/02 |
| | | | 705/5 |
| 2015/0123818 A1* | 5/2015 | Sellschopp | G01C 21/3484 |
| | | | 340/932.2 |
| 2015/0149265 A1* | 5/2015 | Huntzicker | B60W 30/06 |
| | | | 705/13 |
| 2015/0161890 A1* | 6/2015 | Huntzicker | G08G 1/147 |
| | | | 340/932.2 |
| 2015/0203111 A1* | 7/2015 | Bonnet | B62D 15/027 |
| | | | 701/25 |
| 2015/0219464 A1* | 8/2015 | Beaurepaire | G01C 21/3617 |
| | | | 701/538 |
| 2015/0344028 A1* | 12/2015 | Gieseke | B60W 30/00 |
| | | | 701/1 |
| 2015/0346727 A1* | 12/2015 | Ramanujam | B62D 15/0285 |
| | | | 701/23 |
| 2015/0360720 A1* | 12/2015 | Li | B62D 15/027 |
| | | | 701/400 |
| 2015/0371541 A1* | 12/2015 | Korman | G08G 1/147 |
| | | | 340/932.2 |
| 2016/0012726 A1* | 1/2016 | Wang | G08G 1/0112 |
| | | | 340/932.2 |
| 2016/0055749 A1* | 2/2016 | Nicoll | G08G 1/143 |
| | | | 340/932.2 |
| 2016/0075369 A1* | 3/2016 | Lavoie | B62D 15/0285 |
| | | | 180/446 |
| 2016/0107689 A1 | 4/2016 | Lee | |
| 2016/0117926 A1* | 4/2016 | Akavaram | G08G 1/143 |
| | | | 340/932.2 |
| 2016/0185389 A1* | 6/2016 | Ishijima | B62D 15/0285 |
| | | | 701/41 |
| 2016/0189435 A1* | 6/2016 | Beaurepaire | G05D 1/021 |
| | | | 705/13 |
| 2016/0207528 A1* | 7/2016 | Stefan | B60W 30/06 |
| 2016/0236680 A1* | 8/2016 | Lavoie | B62D 15/0285 |
| 2016/0257304 A1* | 9/2016 | Lavoie | B60W 30/06 |
| 2016/0284217 A1* | 9/2016 | Lee | G08G 1/143 |
| 2016/0288657 A1* | 10/2016 | Tokura | B60L 11/182 |
| 2016/0304088 A1* | 10/2016 | Barth | B60T 7/22 |
| 2016/0321926 A1* | 11/2016 | Mayer | G08G 1/0112 |
| 2016/0334797 A1* | 11/2016 | Ross | G05D 1/0027 |
| 2016/0358474 A1* | 12/2016 | Uppal | G08G 1/168 |
| 2016/0368489 A1* | 12/2016 | Aich | B60W 30/06 |
| 2016/0371607 A1* | 12/2016 | Rosen | G06Q 10/02 |
| 2017/0001650 A1* | 1/2017 | Park | B60W 50/08 |
| 2017/0028985 A1* | 2/2017 | Kiyokawa | B62D 15/0285 |
| 2017/0072947 A1* | 3/2017 | Lavoie | B60W 50/087 |
| 2017/0076603 A1* | 3/2017 | Bostick | B62D 15/0285 |
| 2017/0116790 A1* | 4/2017 | Kusens | G07B 15/02 |
| 2017/0123423 A1* | 5/2017 | Sako | G05D 1/0088 |
| 2017/0132482 A1* | 5/2017 | Kim | G06K 9/00812 |
| 2017/0144654 A1* | 5/2017 | Sham | B60W 30/06 |
| 2017/0144656 A1* | 5/2017 | Kim | B60W 30/06 |
| 2017/0147995 A1* | 5/2017 | Kalimi | G06Q 20/10 |

FOREIGN PATENT DOCUMENTS

| | | |
|---|---|---|
| KR | 1020160051993 A | 5/1916 |
| KR | 1020090040024 A | 4/2009 |
| WO | WO 2011141096 A1 | 11/2011 |

* cited by examiner

Parking Assessment Area Evaluation

| Property | Criteria |
|---|---|
| Distance from Destination in Miles | < 4 |
| Probability of Finding Parking | > 98% |

Parking Zone(s) Evaluation

505

| Property | Criteria |
|---|---|
| Number of Suitable Spots in Zone | > 3 |
| Probability of At Least One Suitable Spot Being Available upon Arrival | > 70% |

1001 — Property column
1002 — Criteria column

Parking Spot Evaluation

| Property | Criteria |
|---|---|
| Price of Parking Spot | < 5 |
| Safety of Parking Spot | > 99% |
| Lane | Same as Vehicle |

FIG. 11B

SYSTEM AND METHOD FOR AUTOMATIC ACTIVATION OF AUTONOMOUS PARKING

CROSS-REFERENCE TO RELATED APPLICATION

This application is a continuation of U.S. application Ser. No. 14/993,922 filed on Jan. 12, 2016, which is hereby incorporated by reference in its entirety.

TECHNICAL FIELD

The present disclosure generally relates to a system and method for automatically activating autonomous parking ("autopark") with a navigation program. More particularly, the navigation program may automatically cause a vehicle to automatically execute autopark upon sensing certain conditions.

BACKGROUND

Vehicles are typically incapable of moving in a side-ways or lateral direction. As a result, when parallel parking, a driver must enter the spot at an angle, and then adjust so that the vehicle's length is parallel to the street and the two outer wheels are sufficiently close to the street's edge.

Difficulty arises when two parked cars lie on both sides of a potential parking spot. In this case, the driver must parallel park while avoiding contact with the parked cars. This typically involves backing into the potential spot at a severe angle with respect to the street's edge, then gradually softening the angle as the rear of the vehicle slides into place.

To improve a driver's experience, car manufacturers have recently introduced automatic parking programs ("autopark"). When activated, autopark is capable of automatically parallel parking a car. The vehicle autoparks by measuring the potential parking spot's dimensions with a sensor, then applying a mathematical model to the dimensions to generate the proper speed, approach angle, etc. for parallel parking. Autopark programs can safely parallel park a car faster than an experienced driver.

A problem with existing autopark programs is that they require user-activation via a button or command. As a result, some drivers forget to initiate autopark and manually park their car in a parking spot. As a result, traffic may build up behind the driver, among other potential problems.

SUMMARY

In various embodiments, the present disclosure resolves those problems by providing systems and methods for parking a vehicle.

The system includes a vehicle including a motor, sensors, a steering system, a processor, and a memory; an autopark program operatively connected to the vehicle's steering system; a navigation program operatively connected to the vehicle and configured to determine the vehicle's speed and lane with the sensors, to evaluate the data, and in response to the evaluation, to automatically execute the autopark program.

The method of parking a vehicle having a motor, sensors, a steering system, a processor, and a memory, includes: determining the vehicle's speed and lane with the sensors and a navigation program operatively coupled to the vehicle; evaluating the data; and automatically executing the vehicle's autopark in response to the evaluation.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Figure 1A:
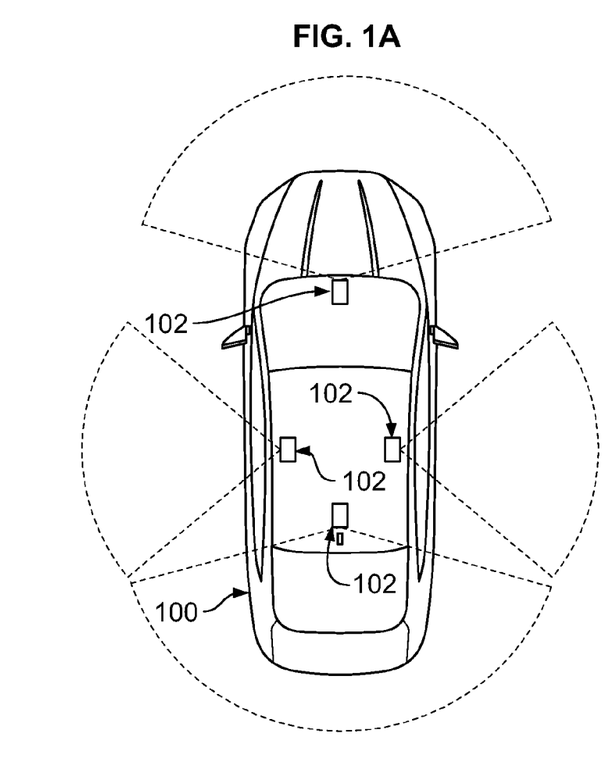
FIG. 1A is a top plan view of a vehicle of the present disclosure.

FIG. 1A shows a vehicle 100 in accordance with one embodiment. The vehicle 100 may be a standard gasoline powered vehicle, a hybrid vehicle, an electric vehicle, a fuel cell vehicle, or any other type of suitable vehicle. The vehicle 100 includes standard features (not shown) such as a dashboard, adjustable seats, one or more batteries, an engine or motor, a transmission, an HVAC system including a compressor and electronic expansion valve, a windshield, doors, windows, seatbelts, airbags, and tires.

Figure 1B:
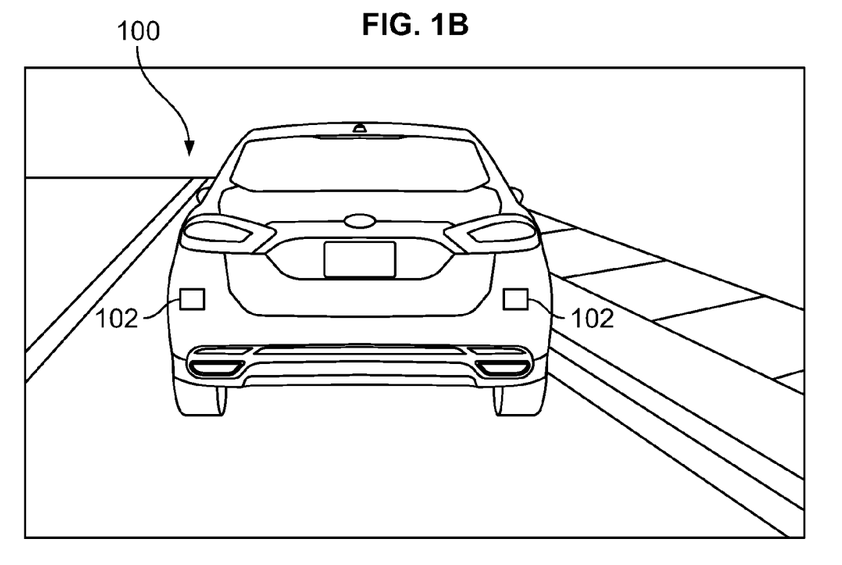
FIG. 1B is a rear perspective view of the vehicle of FIG. 1A.

Vehicle 100 may include sensors 102. The sensors 102 can be arranged in and around the car in a suitable fashion. The sensors can all be the same or different. There can be many sensors, as shown in FIGS. 1A and 1B, or only a single sensor. The sensors may include a camera, sonar, LiDAR, radar, an optical sensor, an ultrasonic sensor, or an infrared device configured to measure properties around the exterior of the vehicle, as indicated by the dashed line in FIG. 1A. Some sensors 102 may be mounted inside the passenger compartment of the vehicle 100, around the exterior of the vehicle, or in the engine compartment of the vehicle 100. At least one sensor 102 may be used to identify the vehicle's driver via facial recognition, speech recognition, or communication with a device, such as a vehicle key or mobile phone personal to the driver. The sensors may have an OFF state and various ON states. The vehicle 100, or a device operatively connected to the vehicle, may be configured to control the states or activity of the sensors. It should be appreciated that the term "internal sensors" includes all sensors mounted to the vehicle, including sensors that are mounted to an exterior of the vehicle.

Figure 2:
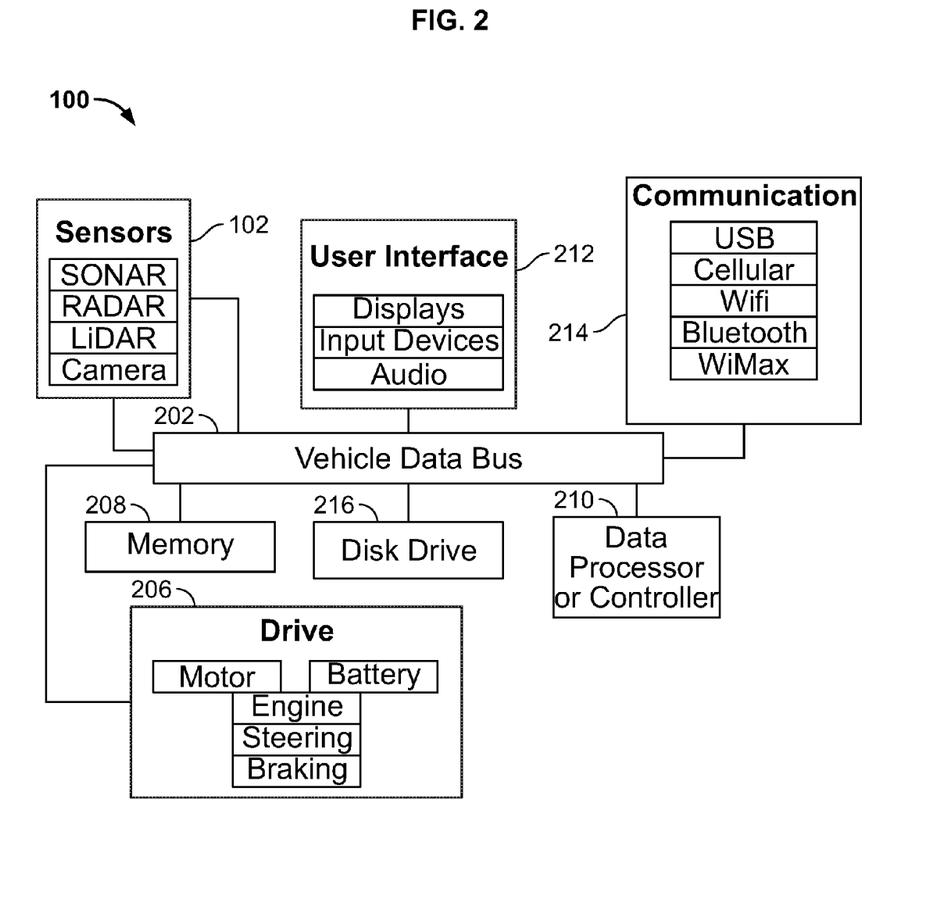
FIG. 2 is a block diagram illustrating electronic components of the vehicle of FIG. 1A.

As shown in FIG. 2, in one embodiment, vehicle 100 includes a vehicle data bus 202 operatively coupled to the sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of the vehicle to input modifications or updates to information referenced by the navigation program 110 as described herein. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers.

The disk drive 216 is configured to receive a computer readable medium. In certain embodiments, the disk drive 216 receives the computer-readable medium on which one or more sets of instructions, such as the software for operating the methods of the present disclosure including the navigation program 110, the autopark engager program 115, and the autopark program 120, can be embedded. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

It should be appreciated that vehicle 100 may be fully autonomous, or partially autonomous. In one embodiment, the vehicle 100 is partially autonomous in that it enables a driver to manually steer, brake, and accelerate and also includes an autonomous autopark software or program 120. When executed by the processor, the autopark program 120 parks the vehicle in a parking space. In various embodiments, the autopark program 120 autonomously operates the steering and the acceleration, but requires the driver to manually operate the brake while parking. In various, embodiments, the autopark program 120 autonomously operates the steering, but requires the driver to manually operate the brake and the acceleration while parking. In other embodiments, the autopark program 120 autonomously operates all aspects of parallel parking. The parking space may be any suitable parking space including a parallel parking space, a driveway, or a spot in a garage. The autopark program 120 can send and receive data to and from sensors 102, user interface 212, communication devices 214, drive 206, or any other component operatively connected to the vehicle data bus 202, to safely and effectively autonomously park a vehicle. Suitable autoparks programs are known in the art.

Figure 4A:
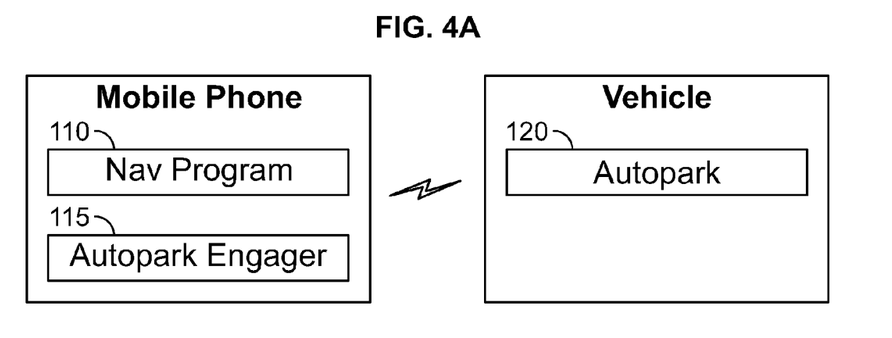
FIGS. 4A, 4B, and 4C illustrate the location of software associated with the vehicle of FIG. 1A and the mobile device of FIG. 3.

In one embodiment, shown in FIG. 4A, autopark engager program or software 115 resides in the memory of a mobile device 105 operatively connected to the vehicle. The autopark engager program 115, when being executed, may be configured to automatically activate the vehicle's autopark 120 in response to an evaluation (discussed below).

The mobile phone or device 105 is operatively connected to the vehicle 100 via any suitable data connection such as WiFi, Bluetooth, USB, or a cellular data connection. Although this disclosure generally refers to a mobile phone 105, it should be appreciate that mobile phone 105 may be any suitable device such as a laptop.

Figure 3:
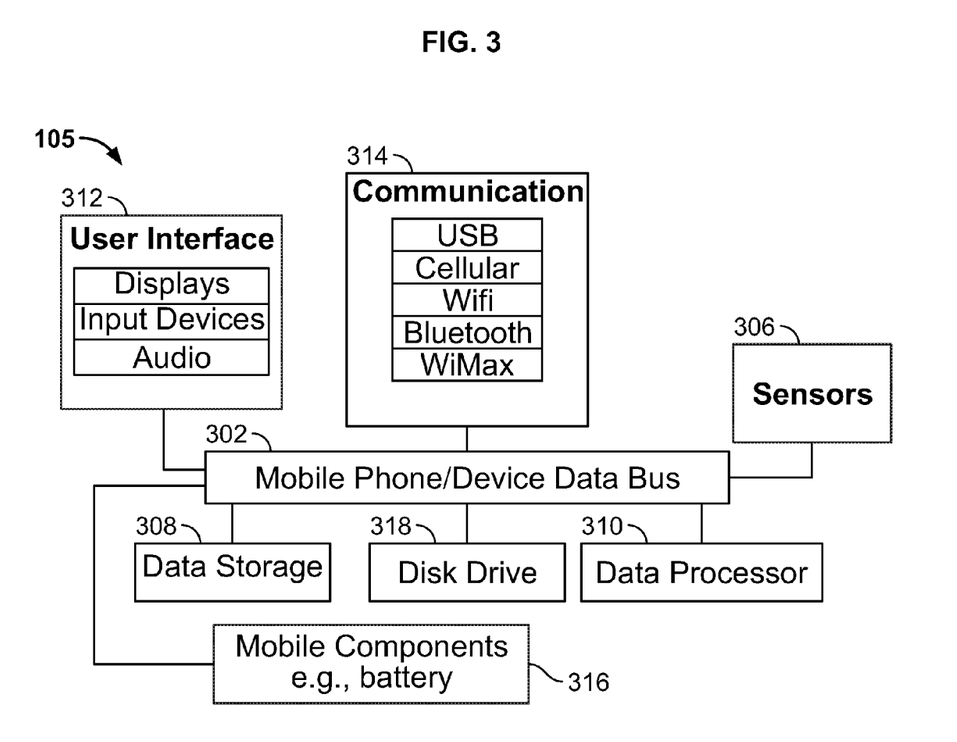
FIG. 3 is a block diagram illustrating electronic components of a mobile device operatively connected to the vehicle of FIG. 1A.

In one embodiment, shown in FIG. 3, mobile phone 105 includes a data bus 302, operatively coupled to mobile phone sensors 306, mobile components 316, memory or data storage 308, a processor or controller 310, a user interface 312, and communication devices 314. It should be appreciated that the electronic features of the mobile phone 105 may be similar to the features of the vehicle 100 as described above. For example, the communication devices 314 of the mobile phone 105 may operate similar to the communication devices 214 of the vehicle 100. The same applies to the user interface 312, the sensors 306, the data storage 308, the processor 310, and the disk drive 318.

Figure 4B:
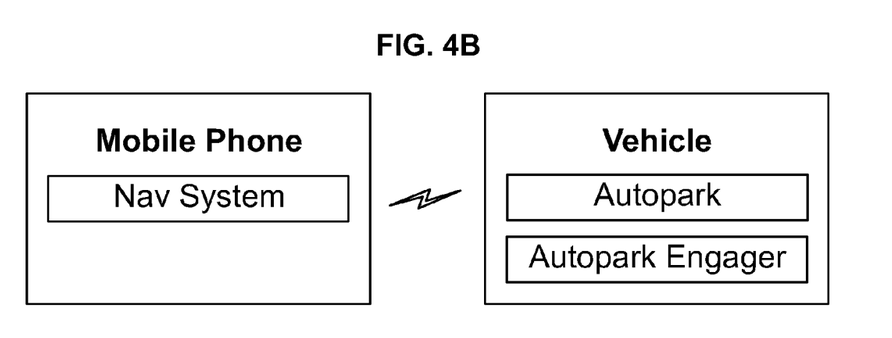
Figure 4C:
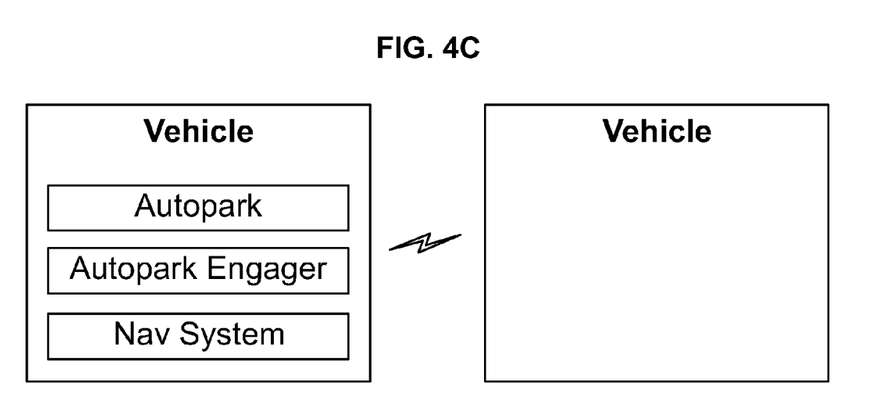

As shown in FIGS. 4A, 4B, and 4C, in various embodiments the vehicle 100 or the mobile phone 105 store software programs in the memory 208, 308, or in the computer readable medium for execution by processor 210 or 310. Upon execution, the programs enable the vehicle 100 or the mobile phone 105 to transmit and receive information to and from any components operatively connected to the processors 210, 310, including remote devices operatively connected to the processors 210, 310 via communication devices 214, 314.

One embodiment of the present invention includes the navigation program 110, the autopark engager program 115, and the autopark program 120. Although the programs are shown as distinct in FIG. 4, it should be appreciated that the programs may be different software routines embedded in a single program. For example, the navigation program 110 may include the autopark engager program 115. It should be appreciated that any program 110, 115, and 120 may be stored in the vehicle 100, the mobile phone 105, or an external computer (not shown) operatively connected to the vehicle 100 or the mobile phone 105. It should be appreciated that any program 110, 115, and 120 may be executed on a processor remote from the device. For example, the mobile phone 105 may store programs that are executed on the vehicle processor 210.

Figure 5:
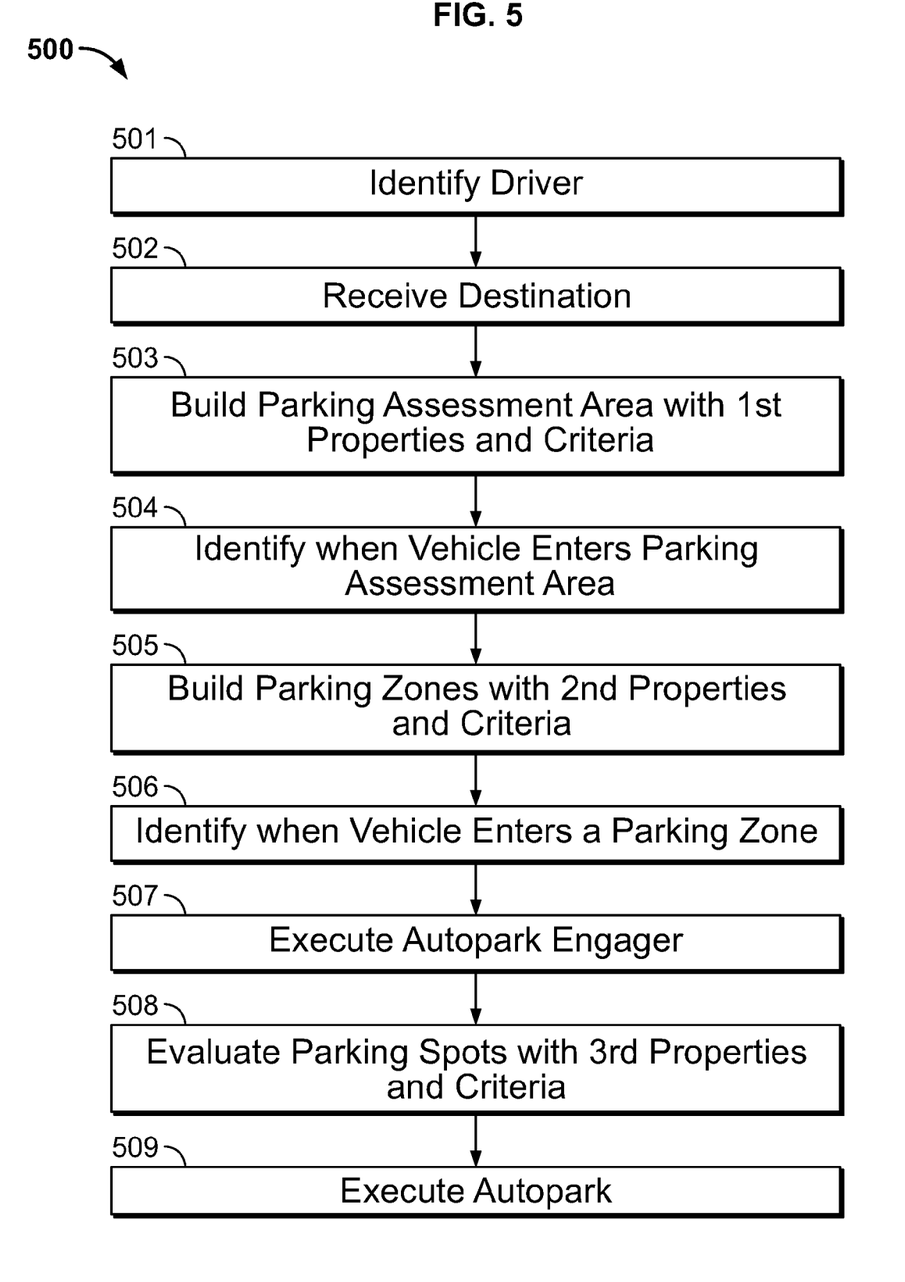
FIG. 5 is a flowchart of an example method for engaging autopark.

FIG. 5 shows an overview of one embodiment of the present disclosure. In step 501, the navigation program 110 may execute an identification routine confirming the driver's identity through a sensor, an input device, or a communication device. If the navigation program 110 is executed on the mobile phone, the mobile phone may query sensors from the vehicle to confirm the driver's identity.

The navigation program 110 receives a destination in step 502. The driver can manually enter the destination into an interface in the navigation program 110 or the navigation program 110 can receive an electronic command from an external source with the destination. In this example embodiment, shown in FIG. 4A, the navigation program 110 or software 110 resides in memory on the mobile phone 105, which is operatively connected in a wired or wireless manner to the vehicle.

Figure 7A:
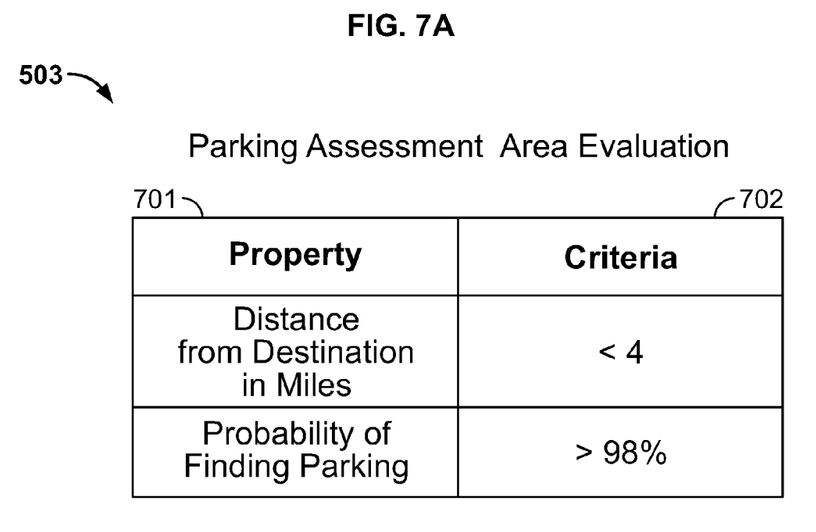
FIG. 7A is an example of a parking assessment area evaluation.
Figure 7B:
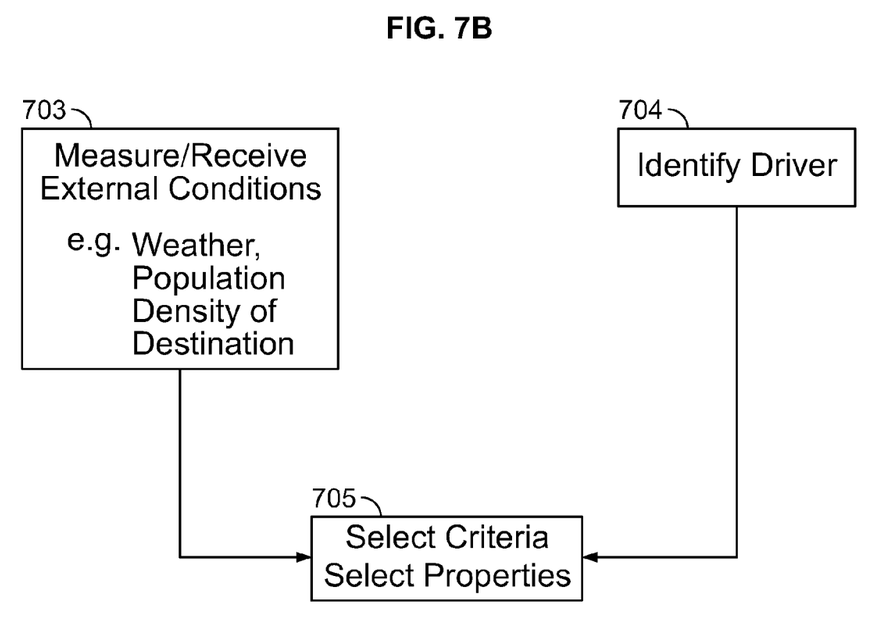
FIG. 7b is a flowchart of an example method for generating criteria for the evaluation of FIG. 7A.

In step 503, the navigation program 110 uses the mobile processor to generate a parking assessment area 604 by comparing first properties to first criteria. FIGS. 7A and 7b (discussed later) show this step in detail. In step 504, the navigation program 110 compares the vehicle's location to the parking assessment area 604. In one embodiment, the navigation program 110 uses the mobile phone's location as a proxy for the vehicle's location. In another embodiment, the vehicle sends its current location to the mobile phone.

Figure 10A:
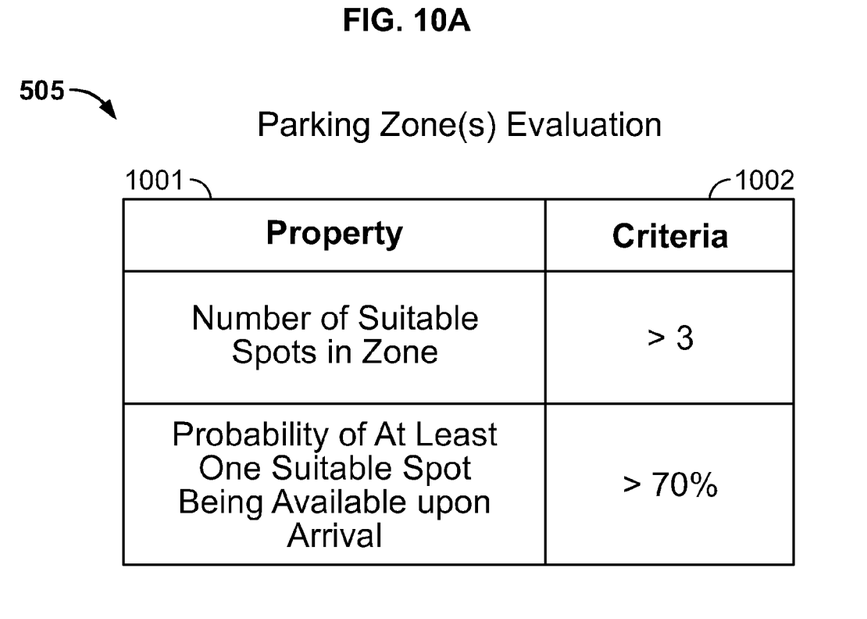
FIG. 10A is an example of a parking zone evaluation.
Figure 10B:
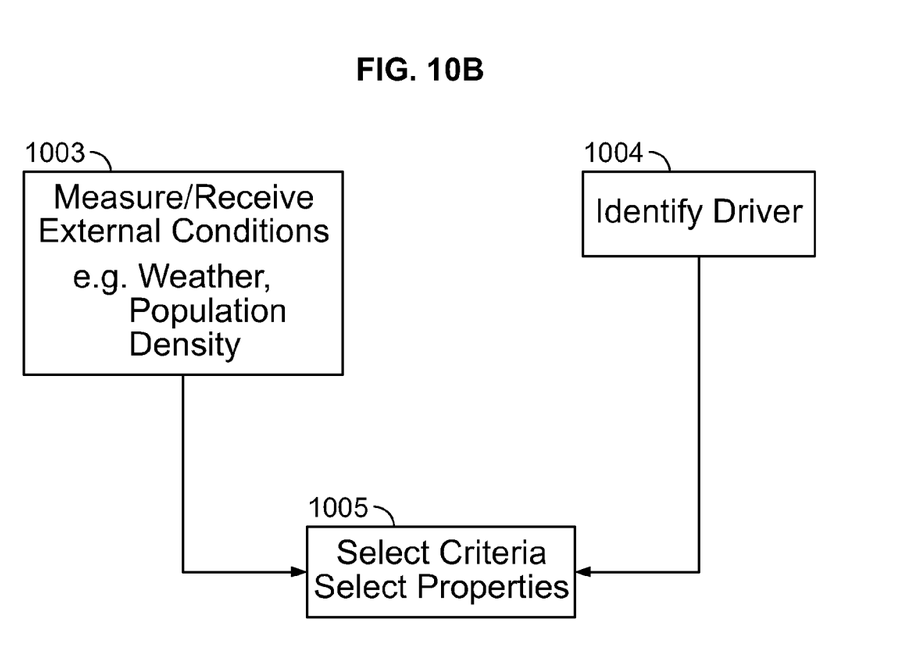
FIG. 10B is a flowchart of an example method for generating criteria for the evaluation of FIG. 10A.

When the vehicle 100 enters the parking assessment area 604, the method advances to step 505. The navigation program 110 now selects or generates one or more parking zones 904 by comparing second properties to second criteria. FIGS. 10A and 10B (discussed later) show this step in detail. In step 506, the navigation program 110 tracks the location of the vehicle 100 in comparison to the parking zones.

Figure 11A:
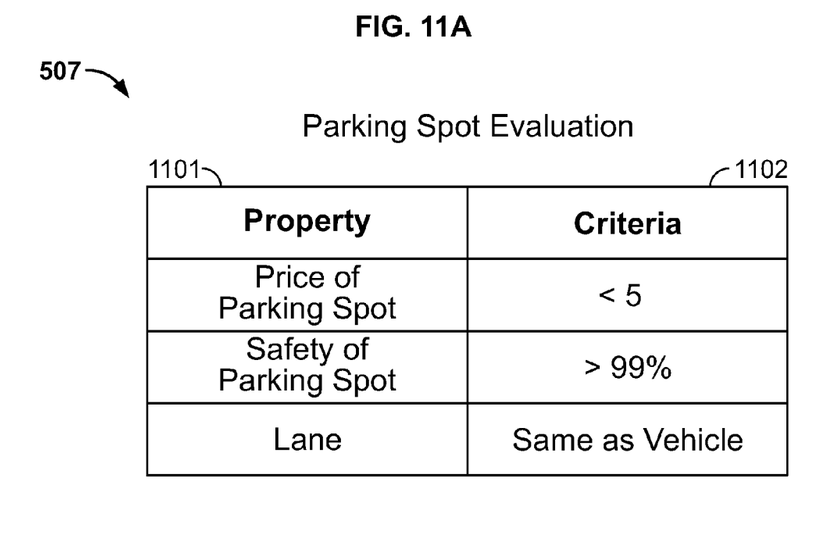
FIG. 11A is an example of a parking spot evaluation.
Figure 11B:
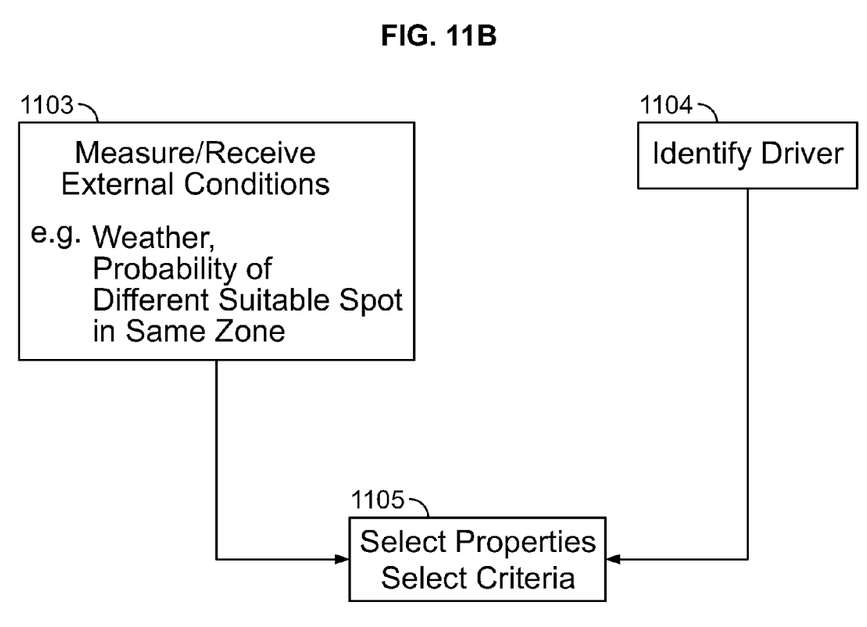
FIG. 11B is a flowchart of an example method for generating criteria for the evaluation of FIG. 11A.

The method advances to step 507 when the navigation system senses that the vehicle has crossed into one of the parking zones. In step 507, the mobile phone executes the autopark engager program 115. In step 508, the autopark engager program 115 evaluates parking spaces by comparing third properties to third criteria. FIGS. 11A and 11B (discussed later) show this step in detail. In step 509, the autopark engager program 115, in response to suitable evaluation, sends an electronic command causing the vehicle 100 to execute its autopark program 120. As stated above, the autopark or program is configured to autonomously park the vehicle 100.

Figure 6:
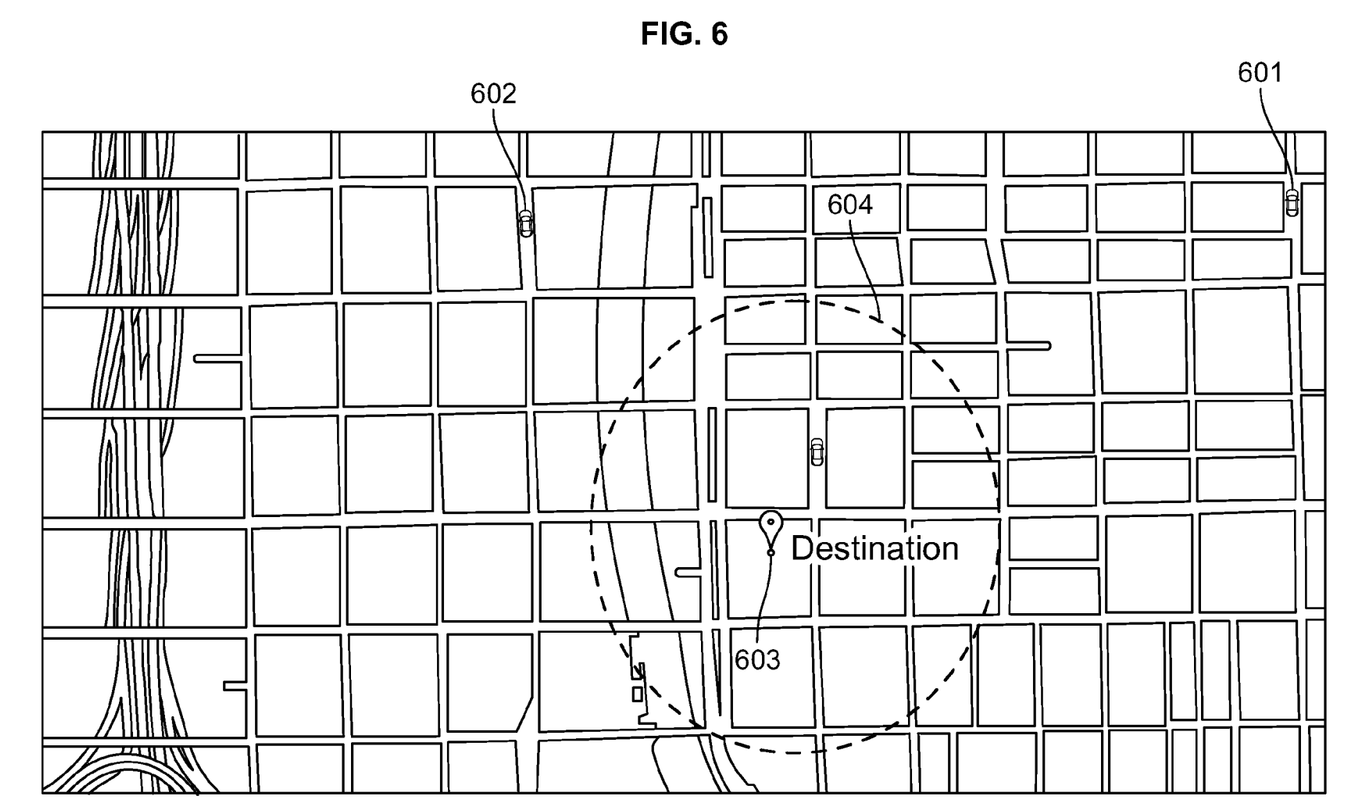
FIG. 6 is an example map including a parking assessment area

FIG. 6 shows an overhead virtual map of a city 601 generated by the navigation program 110. The map 601 of FIG. 6 shows the vehicle's current location 602, the driver's destination 603, and a parking assessment area 604 defined around the driver's destination 603.

The parking assessment area 604 may be user adjustable. For example, the navigation program 110 may enable a user or driver to define the assessment area as a two-mile radius around the destination. Alternatively, or in addition, the driver may define the assessment area in terms of travel time from the destination. In this case, the navigation program 110 may query traffic information from an external source then automatically define the assessment area 604 in terms of travel time. For instance, the driver may define the assessment area to include any location less than five minutes away from the destination. The vehicle may dynamically update the assessment area based on new information.

The navigation program 110 may have an interface enabling a user or driver to select first properties 701 and first criteria 702. The navigation program 110 may compare the first properties 701 to the first criteria 702 in order to generate the parking assessment area 604. For example, as shown in FIG. 7A, the driver may require the outer perimeter of the parking assessment area to be less than four miles from the destination with at least a 98% chance of including a suitable parking spot. The first properties may include distance or time to the destination from the outer perimeter of the parking assessment area 704, accessibility of public transportation in the assessment area 704, relatively safety or security of the assessment area 704.

As shown in FIG. 7b, the navigation program 110 may automatically select the first properties 701 and the first criteria 702 in step 705 based on external conditions 703 and the driver's identity 704. For example, a particular driver may choose a first set of properties and criteria for Chicago, Ill. and a second set of properties and criteria for Madison, Wis. The driver may further choose a third set of properties and criteria for rain and a fourth set of properties and criteria for snow. The navigation program 110 may combine the various sets based the measured external conditions. For example, the navigation program 110 may apply a set of properties and criteria based on a combination of the first set and the third set when the destination is Chicago and the weather is rain.

Figure 8:
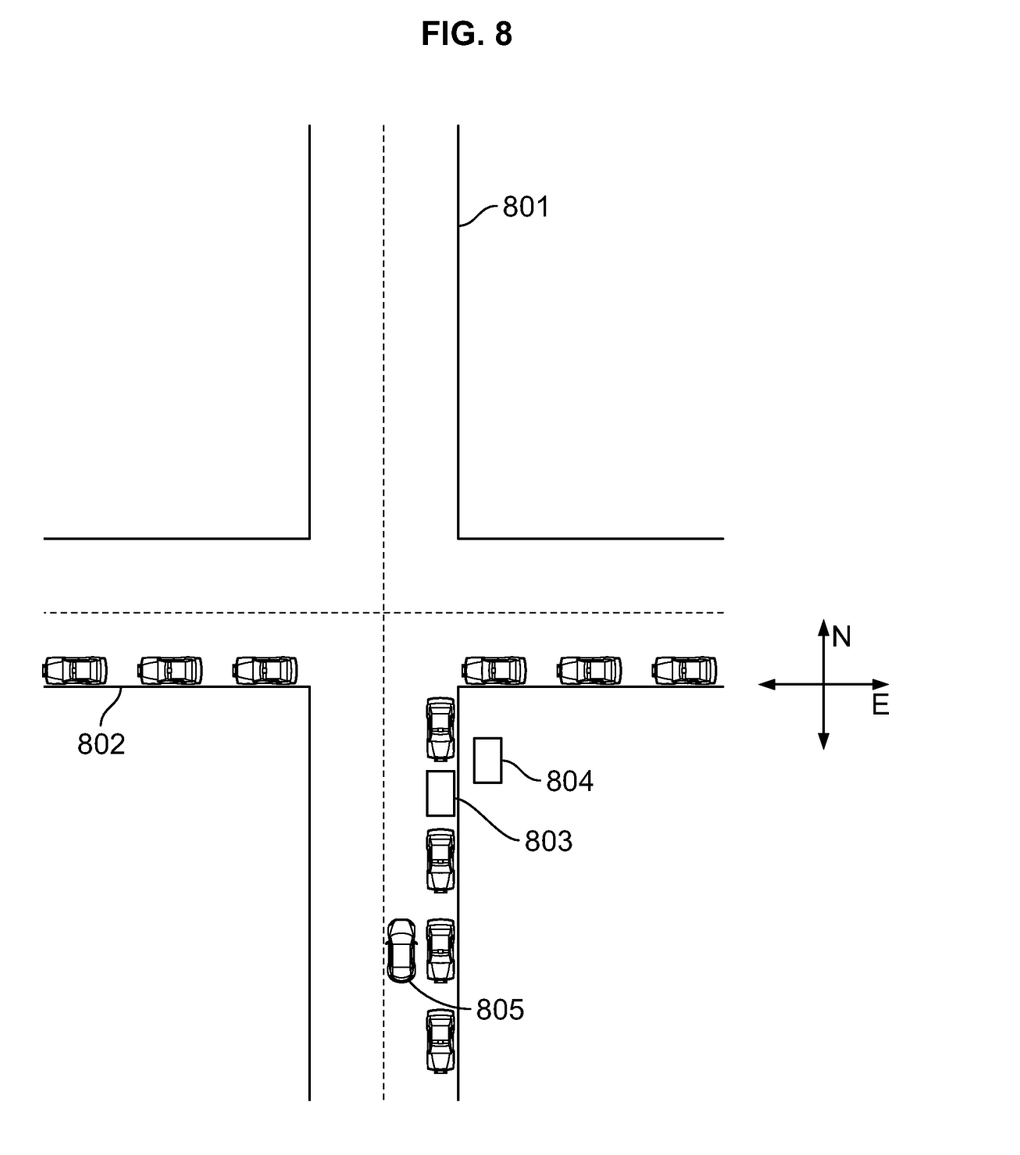
FIG. 8 is a top plan view of components used to generate parking data.

FIG. 8 illustrates two example methods of collecting parking spot data. In FIG. 8, Main Street 801 and Broad Street 802 intersect. Cars or vehicles are only legally allowed to park on the East side of Main Street 801 and on the South side of Broad Street 802. There is only a single parking spot 803 suitable for the vehicle 100.

One or more static sensors 804 may be installed on the side of the road. The static sensors 804 may be integrated into existing infrastructure such as buildings, light posts, and meters. The static sensors 804 detect when one or more parking spots become available. They may also measure other properties of the parking spot such as its length. The static sensors 804 may send information directly to the vehicle, the mobile phone, or an external server.

In addition, a third-party or external vehicle 805 may sense an open parking spot using vehicle mounted sensors. For example, when vehicle 805 approaches spot 803, the sensors may capture data relating to the open spot 803. The vehicle 805 may assess the data using an internal process coupled to assessment software to ensure that the spot is suitable for a vehicle, or may transmit the raw data to an external server. The external server may analyze the data immediately, it may simply store the data and transmit it in response to a query, or it may analyze the data in response to a predetermined command. It should be appreciated that a similar data capture function could be performed by a pedestrian's mobile phone or an aerial unit such as a drone.

At an appropriate time, such as when the vehicle enters the parking assessment area, the navigation program 110 queries or accesses the parking data to select or generate parking zones 904. As shown in FIG. 10A, the navigation program 110 selects or generates parking zones 904 by comparing second properties 1001 to second criteria 1002.

The second properties may include distance or time to the destination from the parking zone 904, accessibility of public transportation in the parking zone 904, the number of spots in the parking zone, the size of the parking zone, the relatively safety or security of the assessment area 904, and the probability of a spot being available in the parking zone 904 at the driver's projected arrival time.

As shown in FIG. 10B, the navigation program 110 may automatically select the second properties 1001 and the second criteria 1002 based on external conditions 1003 and the driver's identity 1004. For example, a particular driver may highly weight weather, causing the navigation system 110 to select and highly rank properties minimizing the driver's time walking from the parking spot to the destination. For example, a particular driver may choose a first set of properties and criteria for Chicago, Ill. and a second set of properties and criteria for Madison, Wis. The driver may further choose a third set of properties and criteria for rain and a fourth set of properties and criteria for snow. The navigation program 110 may combine the various sets based the measured external conditions. For example, the navigation program 110 may apply a set of second properties and second criteria based on a combination of the first set and the third set when the destination is Chicago and the weather is rain.

Figure 9:
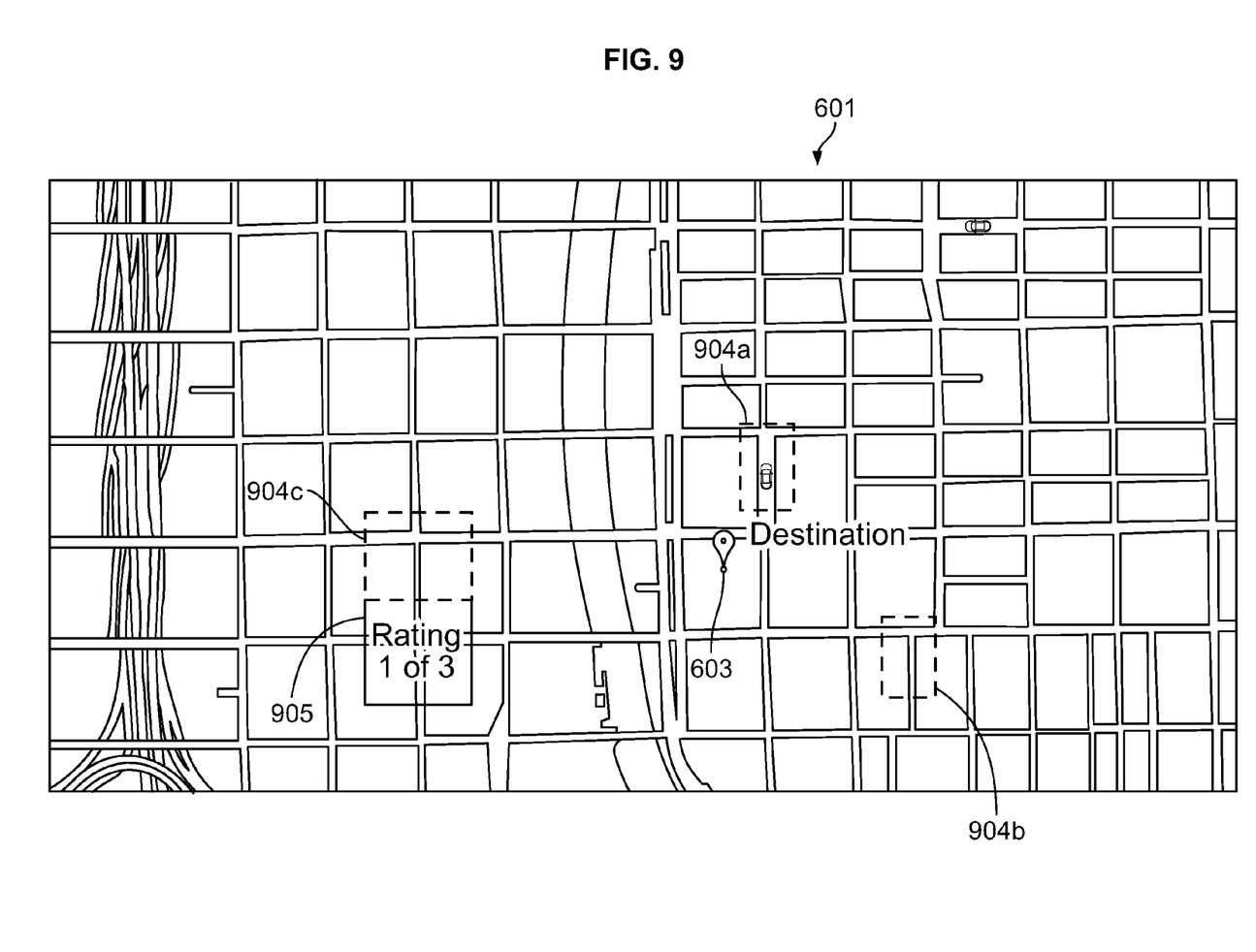
FIG. 9 is an example map including three parking zones.

In FIG. 9 the navigation program 110 has identified three parking zones 904a, 904b, and 904c with one or more suitable parking spots. The navigation program 110 may rank the parking zones. A zone can be selected manually or automatically. The navigation program 110 now directs the driver to the selected zone. The directions can be to the zone's midpoint or to the closest point on the zone's perimeter.

The navigation program 110 monitors the vehicle's location with respect to the zones 904. When the vehicle enters one of the zones 904, the navigation program 110 causes the vehicle 100 or mobile phone 105 to alert the driver via the user interfaces 212 or 213. In one embodiment, a series of light emitting diodes (not shown) light up on the vehicle's gauge cluster. In one embodiment, the diodes remain on at least until the autopark engager program 115 has finished running. The navigation program 110 simultaneously sends a command to execute the autopark engager program 115. It should be appreciated that if the vehicle is partially autonomous, the vehicle may automatically assume driving control when the autopark engager program 115 becomes active. In one embodiment, the driver retains full manual control until the autopark engager program 115 activates autopark.

As shown in FIG. 10A, the autopark engager program 115 compares third properties 1101 to third criteria 1102. The autopark engager program 115 measures or receives the third properties via any suitable source including vehicle mounted sensors 102, sensors in the mobile phone 105, or an external database of information. Third properties may include the vehicle's speed, the vehicle's direction, the vehicle's lane, the total number of lanes, whether the vehicle is in the lane closest to open parking spots, the geometry of open parking spots, the position of open parking spots, the position and speed of pedestrians, and the position and speed of other vehicles.

When the third properties satisfy the third criteria, the autopark engager program 115 sends a command causing the autopark program 120 to execute. Similar to the navigation program 110, the autopark engager program 115 may automatically select the third properties and the third criteria 1105 based on external conditions 1103 and the driver's identity 1104.

In order to conserve resources, the navigation program 110 of the present disclosure may only build or display parking zones 904 after the driver enters the parking assessment area 604 to avoid overloading the driver with information. In one embodiment, the autopark engager program 115 is only executed after the driver enters a parking zone. This reduces the possibility of the vehicle assuming automatic control before the driver is ready.

It should be appreciated that the system of the present disclosure may be configured to run in locations with little or no parking data. The navigation program 110 may evaluate the quantity or quality of parking data before or after generating the assessment area. In one embodiment, the navigation program 110 will only build parking zones in response to a sufficient amount of parking data. The degree of sufficiency may be user adjustable via an interface. If the parking data is insufficient, the navigation system may be programmed to inform the driver that the autopark engager program 115 will be inactive and the driver must manually initiate autopark.

In one embodiment, the navigation program 110, in response to insufficient or unsuitable parking data, uses internal vehicle sensors to activate the autopark engager program 115. For example, once a driver enters the parking assessment zone, the navigation system may use internal vehicle sensors such as a camera, sonar, radar, or LiDAR to locate a suitable parking spot. After locating a suitable parking spot, the navigation program 110 may automatically enable the autopark engager program 115 and notify the driver. At this point, the autopark engager program 115 may execute as described above.

It should be appreciated that the navigation program 110 and the autopark engager program 115 may only collect or assess information on demand. For example, if the navigation program 110 has been configured to build the parking assessment area exclusively based on proximity to the destination, then the navigation system may delay collecting or assessing parking information until the vehicle 100 is a predetermined distance from the destination.

It should be appreciated that generating the parking assessment area 604 and the parking zones 904 may be a dynamic process, continuously being updated in response to new information. In one embodiment, the first, second, and third properties and criteria may be dynamically updated based on a change in external conditions. In one embodiment, the systems of the present disclosure require driver-authorization (or at least notify the driver) before applying a dynamic update.

In one embodiment, the driver may adjust when and how the parking assessment area 604 and parking zones 904 are displayed with user adjustable display criteria. In one embodiment, the assessment area 604 and the zones 904 are displayed sequentially, to reduce map clutter.

Although the virtual map 601 is shown from a top plan view, it may be displayed from a top or side perspective view. The driver may adjust the area shown on the map by zooming or moving the map's center. The driver may also adjust the level of detail on the map, the kinds of details shown on the map, and the presentation of those details. For example, the navigation program 110 may enable the driver to display the parking assessment area in one color and the one or more parking zones in another color. In one embodiment, the navigation program 110 automatically displays the parking assessment area and the parking zones sequentially, so that both are not simultaneously present on the map.

For the purposes of the claims, the term "autopark" is defined to mean a program or software configured at least to autonomously steer a vehicle from a traffic lane to a parking space.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A system for parking a vehicle comprising:
the vehicle including a motor, sensors, a steering system, a processor, and a memory;
a mobile device associated with the vehicle;
an autopark program operatively connected to the vehicle's steering system;
a navigation program and the autopark program operatively connected to the vehicle and configured to determine the vehicle's speed with the sensors and the vehicle's position relative to the mobile device, to evaluate parking spot data, and in response to the evaluation, to automatically execute the autopark program.

2. The system of claim 1, wherein the navigation program is configured to determine the vehicle's speed and position relative to the mobile device when the vehicle enters one of one or more precalculated zones.

3. The system of claim 2, wherein the navigation program is configured to determine the one or more precalculated zones only in response to one or more measured conditions meeting a user-adjustable threshold.

4. The system of claim 3, wherein the measured condition is the vehicle's distance proximity to a received destination.

5. The system of claim 3, wherein the measured condition is the vehicle's time proximity to a received destination.

6. The system of claim 2, wherein the navigation program is configured to display the one or more precalculated zones on a virtual map.

7. The system of claim 6, wherein the navigation program is configured to display numeric rankings of the one or more precalculated zones on the virtual map, and the numeric rankings are calculated according to predetermined user-adjustable criteria.

8. The system of claim 1, wherein the evaluation includes comparing the vehicle's speed and position relative to the mobile device to user-adjustable criteria.

9. The system of claim 1, wherein the navigation program is configured to perform the evaluation in response to a condition detected by a camera, sonar, radar, or lidar sensor mounted on the vehicle.

10. The system of claim 2, wherein the one or more precalculated zones are calculated by comparing the parking spot data to user-adjustable criteria.

11. The system of claim 10, configured to automatically select the user-adjustable criteria in response to at least one of: a measured weather condition, a measured traffic condition, an identity of a driver, and a kind of preselected destination.

12. The system of claim 1, configured to determine an assessment area based on user-adjustable criteria.

13. The system of claim 12, configured only to assess parking spot data when the vehicle is inside the assessment area.

14. The system of claim 1, wherein the navigation program is configured to determine the vehicle's position relative to the mobile device by using the mobile device's position as a proxy for the vehicle's position.

15. The system of claim 1, wherein the navigation program determines a lane associated with the vehicle using the sensors.

16. A method of parking a vehicle having a motor, sensors, a steering system, a processor, and a memory, with a mobile device associated with the vehicle, comprising:
determining the vehicle's speed with the sensors and the vehicle's position relative to the mobile device with a navigation program and an autopark program operatively connected to the vehicle;
evaluating parking spot data; and
automatically executing the autopark program in response to the evaluation.

17. The method of claim 16, wherein the navigation program is configured to evaluate the vehicle's speed and position relative to the mobile device when the vehicle enters a precalculated zone.

18. The method of claim 17, wherein the navigation program is configured to determine one or more precalculated zones only in response to one or more measured conditions meeting a user-adjustable threshold.

19. The method of claim 18, wherein the measured condition is the vehicle's distance proximity to a received destination.

20. The method of claim 18, wherein the measured condition is the vehicle's time proximity to a received destination.

* * * * *